Sept. 4, 1945.  A. E. LORCH  2,384,108
PRODUCTION OF BUTADIENE
Filed Nov. 22, 1943
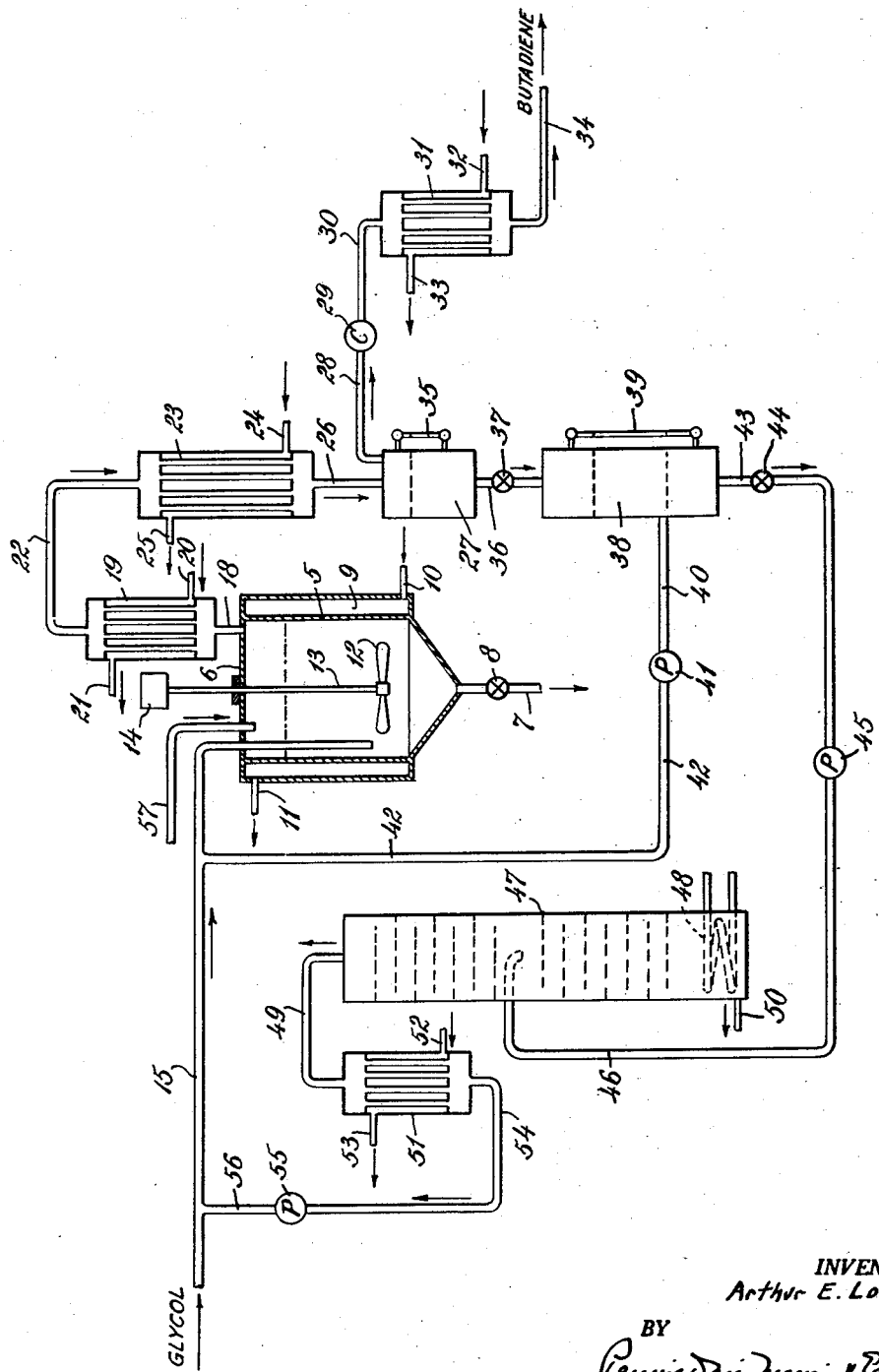
INVENTOR.
Arthur E. Lorch
BY
ATTORNEYS Patented Sept. 4, 1945

2,384,108

UNITED STATES PATENT OFFICE 2,384,108

PRODUCTION OF BUTADIENE

Arthur E. Lorch, Tenafly, N. J., assignor to Air Reduction Company, Incorporated, New York, N. Y., a corporation of New York Application November 22, 1943, Serial No. 511,274

4 Claims. (Cl. 260—681)

This invention relates to the production of 1,3-butadiene from 1,3-butylene glycol and particularly to an improved method affording a commercially practicable procedure for economical recovery of the desired product.

In an application Ser. No. 477,939 filed March 4, 1943, I have disclosed a method of producing butadiene by heating 1,3-butylene glycol in relatively low concentrations in an inert liquid including a dehydration catalyst and in the absence of substantial amounts of water in the liquid phase. The procedure requires the maintenance of a body of a suitable liquid at a temperature favorable to the reaction. The catalyst may be dissolved or suspended in the liquid. The glycol is introduced at substantially the rate at which conversion to butadiene occurs so that no substantial amount of glycol remains at any time in the liquid. The resulting butadiene, being gaseous at the temperature of the reaction, is withdrawn continuously with other vapors arising from the body of liquid and is subsequently separated from such vapors.

It is the object of the present invention to afford further improvements in the method of producing 1,3-butadiene from 1,3-butylene glycol and particularly a method which is adapted to produce high yields of a relatively pure product.

Other objects and advantages of the invention will be apparent as it is better understood by reference to the following specification and the accompanying drawing, which illustrates diagrammatically an apparatus suitable for the practice of the invention.

I have discovered that quite unexpectedly the procedure as described in my earlier application can be improved materially if the catalyst employed is reduced to a finely divided form in dry condition and mechanically mixed with a dry, finely divided inert extender. As an extender, the most satisfactory material is diatomaceous or infusorial earth. A commercially available form of diatomaceous earth known as "Filtercel" (produced by Johns Manville Corporation) is suitable for the purpose. Other grades of powdered infusorial earth may be used.

In preparing the catalytic material, I grind the selected catalyst to a finely divided condition. Grinding should be stopped short of the point where the particles of the catalyst tend to cake or adhere to the walls of the grinder. Any suitable grinder may be employed, such as a ball mill or the like. When the catalytic material has been reduced to finely divided condition, a suitable quantity of finely divided diatomaceous earth, for example, is mixed with the catalyst and the grinding is continued for a short time until the materials are thoroughly incorporated with each other. The proportions of the catalyst and the extender may be varied widely. I find that equal proportions by weight are suitable for the attainment of the desired results. When the catalyst material has been prepared, it is suspended in the inert liquid. The liquid is heated to the required temperature, and the glycol is introduced for reaction.

The temperature of the liquid heating bath will depend somewhat upon the activity of the catalyst, the rate of feed and the kind of heating liquid used. Temperatures between 220° and 350° C. are most favorable for the reaction, and I prefer to conduct it within the range of 260° to 285° C. If the temperature is as low as 200° C., the reaction becomes too slow to warrant commercial operation. If it is permitted to exceed 350° C., there is a tendency toward undesired side and decomposition reactions.

Many different types of liquids may be utilized in the heating bath. In general, the characteristics of such a liquid should be that it is inert under the conditions of operation; that is, that the liquid does not decompose and does not react on the butylene glycol, butadiene or any other products of the reaction. The liquid should not have a boiling point below that of the reaction temperature, although such a liquid may be used, provided the reaction is conducted under pressure. Hence a liquid should be selected which does not boil at atmospheric pressure below the prevailing temperature.

It is not necessary that the heating liquid and butylene glycol should be completely miscible. As already indicated, the temperature of the heating liquid and the rate of feed of butylene glycol are adjusted so that there is no accumulation of butylene glycol in the heating liquid during the operation. It is believed that slight solubility of the butylene glycol in the heating liquid of the order of 1% or less is favorable to the reaction, but in this respect I do not wish to be restricted to any particular theory.

Among the liquids which are suitable for use as heating liquids I have employed the following: diphenyl ethane, hexaethyl benzene, benzyl ether, a mixture of diphenyl and diphenyl oxide known as "Dowtherm," a refined petroleum product known as "Nujol," Texas Co. #531 wash oil, a topped fuel oil having a boiling point of 260–270° C., Bunker C oil, and a higher alcohol known to the trade as "Cyclic C18 alcohol." It will be observed that the chemical composition of the bath liquid may differ markedly. The essential characteristics have been indicated. Undoubtedly a considerable number of additional materials having similar characteristics and therefore available for the purpose could be selected.

As the catalyst, I prefer to employ "ammonium phosphate." The term "ammonium phosphate" is employed as a general designation of the tri, di and mono ammonium phosphates or mixtures of these salts. It is employed also to include decomposition products of these phosphates which are subject to modification when subjected to temperatures such as those employed in the method. The precise composition of the resultant phosphate salt or salts in the heating bath at the temperature maintained cannot be determined accurately. Any of the phosphates mentioned or the resulting phosphates in the heating bath are active catalysts for the reaction.

While "ammonium phosphate" is preferred as a catalyst for the reaction, various other catalysts are available and can be used. Among them are toluene sulphonic acid, ammonium sulphate, a mixture of calcium and ammonium phosphates, aniline phosphate, and acid sodium phosphate. Any of these catalysts may be pulverized and mixed with the inert extender as hereinbefore described and introduced as the catalyst material to the heating bath. Preferably the heating bath should be agitated to maintain the desired suspension, and consequently uniform contact of the glycol with the catalyst.

The proportion of catalyst is largely dependent upon the catalytic area exposed. With finely divided catalysts mechanically mixed with an extender as hereinbefore described, I find that an amount of 2% by weight of the liquid or even less is required to insure adequate activity. The proportion of catalyst can, however, be varied from 2% to 30% of the weight of the inert liquid to secure the desired result.

The procedure will be readily understood by reference to the drawing, which is merely illustrative of suitable equipment for the purpose. The reactor 5 is a receptacle having a closure 6 and an outlet 7 controlled by a valve 8. A heating jacket 9 is adapted to be supplied through a pipe 10 with a suitable inert liquid which escapes through a pipe 11 and is reheated for circulation through the jacket. Any suitable heating liquid adapted to be maintained at the desired temperature may be employed. "Dowtherm" is well adapted for the purpose, since it may be readily maintained at the desired temperature to heat the body of liquid within the reactor 5. An agitator 12 is supported on a shaft 13 and is adapted to be driven from any suitable source such as a motor 14 to maintain the desired agitation during the reaction.

The reactor 5 is partially filled with the selected inert liquid in which the mixture of catalyst and extender is suspended. Glycol is introduced through a pipe 15 from any suitable source of supply at substantially the rate of reaction. The glycol enters beneath the surface of the liquid in the reactor and immediately is raised to the temperature of the heating liquid while it is brought into contact with the catalyst. As the result, butadiene is produced and escapes together with water vapor formed as the result of the reaction, some unreacted or partially reacted glycol and possibly some entrained heating liquid, condenser 19. Cooling water is supplied through a pipe 20 and escapes through a pipe 21. The unreacted glycol and any of the bath liquid return through the pipe 18 to the reactor. The remaining vapors are delivered by a pipe 22 to a condenser 23 supplied with cooling water which circulates through pipes 24 and 25. The condensate, consisting of water and partially reacted glycol or butenol, is delivered through a pipe 26 to a collector 27. The butadiene escapes through a pipe 28 and may be delivered to to a gasometer (not shown). Preferably it is compressed in a compressor 29 to a pressure at which it will liquefy at atmospheric temperature. It is delivered through a pipe 30 to a condenser 31. Cooling water is supplied through a pipe 32 and escapes through a pipe 33. The condensed butadiene is withdrawn through a pipe 34.

The level of the condensed liquid in the collector 27 may be observed through a sight glass 35 and as desired it may be delivered through a pipe 36 controlled by a valve 37 to a separator 38. Usually the liquid separates in two levels, the upper level consisting principally of partially reacted glycol. A sight glass 39 permits observation of the liquid level. The upper layer may be withdrawn through a pipe 40 and delivered by a pump 41 and pipe 42 to the pipe 15, through which it is returned to the reactor 5. The liquid in the bottom of the separator 38 is water with some partially reacted glycol or butenol. This liquid may be withdrawn through a pipe 43 controlled by a valve 44 and delivered by a pump 45 through a pipe 46 to a column 47. Heat is supplied at the bottom of the column by a steam coil 48. Rectification in the column results in an effluent consisting of partially reacted glycol and water which escapes through a pipe 49. The bulk of the water is withdrawn at the bottom of the column through a pipe 50. The effluent is delivered to a condenser 51, cooled by water supplied by a pipe 52 and escaping through a pipe 53. Condensate is withdrawn through a pipe 54 and delivered by a pump 55 and pipe 56 to the pipe 15 and is thus returned to the reactor 5.

If the activity of the catalyst in the reactor 5 is decreased after long use, it is sufficient merely to withdraw a portion of the heating liquid through the outlet 7 with the suspended catalyst material therein. Fresh heating liquid with new or revived catalyst can be introduced through a pipe 57 without interfering with the operation of the method. The suspended catalyst material can be separated readily from the withdrawn portion of the heating liquid by filtration or centrifuging. Fresh catalyst material prepared in accordance with the invention can be added to the clarified liquid, and the latter may be utilized in the reaction. If desired, the renewal of the catalyst can be accomplished as a continuous operation, a small amount of liquid being continuously withdrawn and liquid with fresh catalyst material being continuously added.

The practical operation of the invention will be readily understood from the following examples:

*Example I*

12.5 parts by weight of diammonium phosphate were finely ground to a degree just short of that at which packing resulted, and then intimately mixed with 12.5 parts by weight of "Filtercel." The catalyst material was added to 250 parts by weight of Texas Co. #531 wash oil in the reactor. The temperature of the liquid batth was maintained at 250–260° C., and 1,3-butylene glycol was introduced below the liquid level at approximately the rate at which it was converted. The butadiene was separated and recovered as hereinbefore described. The volume of gas so collected was determined, and samples were withdrawn and analyzed for butadiene content. The conversion of the input butylene glycol to butadiene was 77.5%, and the gas produced contained 95.1% butadiene.

*Example II*

The operation was repeated using a commercial grade of powdered infusorial earth as the extender in place of "Filtercel." Otherwise the operation was the same. Butadiene was produced with a conversion of 71% and in a purity of 95.2%.

The foregoing examples are merely illustrative of the various modifications which can be made in the operation of the invention. Success in the procedure does not depend upon the use of a specific heating medium or of a specific catalyst. The important criteria of the invention are the use of a dry mechanical mixture of the catalyst with an inert extender, the maintenance a heating bath at a suitable temperature with the catalyst material distributed therein, and the introduction of the glycol at a rate such that it is converted to butadiene substantially as it is introduced. A particular advantage of the invention as described is that the catalyst remains readily in suspension with little tendency to agglomerate. Any suitable dehydration catalyst which will maintain its activity under the conditions of the reaction may be used. The invention is limited, therefore, only with respect to the essential conditions of operation as hereinbefore set forth.

Various changes may be made in the apparatus employed and in the details of procedure without departing from the invention or sacrificing the advantages thereof.

I claim:

1. The method of producing 1,3-butadiene by dehydration of 1,3-butylene glycol which comprises suspending a mechanical mixture of a dehydrating catalyst and an inert extender in an inert liquid, maintaining the liquid at a temperature between 220° and 350° C., feeding the glycol thereto at substantially the rate at which conversion to butadiene occurs, withdrawing vapor from the body of liquid and separating butadiene from the vapor.

2. The method of producing 1,3-butadiene by dehydration of 1,3-butylene glycol which comprises suspending a mechanical mixture of substantially equal parts by weight of a dehydrating catalyst and an inert extender in an inert liquid, maintaining the liquid at a temperature between 220° and 350° C., feeding the glycol thereto at substantially the rate at which conversion to butadiene occurs, withdrawing vapor from the body of liquid and separating butadiene from the vapor.

3. The method of producing 1,3-butadiene by dehydration of 1,3-butylene glycol which comprises suspending a mechanical mixture of a dehydrating catalyst and an inert extender in an inert liquid, agitating and maintaining the liquid at a temperature between 220° and 350° C., feeding the glycol thereto at substantially the rate at which conversion to butadiene occurs, withdrawing vapor from the body of liquid and separating butadiene from the vapor.

4. The method of producing 1,3-butadiene by dehydration of 1,3-butylene glycol which comprises mixing in dry, finely divided condition a dehydrating catalyst and an inert extender, suspending the mixture in an inert liquid, maintaining the liquid at a temperature between 220° and 350° C., feeding the glycol thereto at substantially the rate at which conversion to butadiene occurs, withdrawing vapor from the body of liquid and separating butadiene from the vapor.

ARTHUR E. LORCH.